United States Patent
Go

(10) Patent No.: US 7,243,084 B2
(45) Date of Patent: Jul. 10, 2007

(54) INFORMATION PROCESSING METHOD AND APPARATUS FOR BILLING

(75) Inventor: Naomi Go, Kanagawa (JP)

(73) Assignees: Sony Corporation (JP); Sharp Kabushiki Kaisha (JP)

( * ) Notice: Subject to any disclaimer, the term of this patent is extended or adjusted under 35 U.S.C. 154(b) by 783 days.

(21) Appl. No.: 10/311,651

(22) PCT Filed: Apr. 23, 2002

(86) PCT No.: PCT/JP02/04050

§ 371 (c)(1),
(2), (4) Date: Mar. 25, 2003

(87) PCT Pub. No.: WO02/089031

PCT Pub. Date: Nov. 7, 2002

(65) Prior Publication Data

US 2004/0133522 A1 Jul. 8, 2004

(30) Foreign Application Priority Data

Apr. 24, 2001 (JP) .............................. 2001-126193

(51) Int. Cl.
*G06Q 30/00* (2006.01)
*G06F 13/24* (2006.01)
(52) U.S. Cl. ........................................ 705/52; 710/260
(58) Field of Classification Search ............. 705/51–54, 705/64, 77–79; 707/9–10, 102–104; 710/47–48, 710/200, 260–266; 712/40, 233, 244
See application file for complete search history.

(56) References Cited

U.S. PATENT DOCUMENTS 6,202,090 B1 * 3/2001 Simone ...................... 709/220
6,308,204 B1 * 10/2001 Nathan et al. ............... 709/221
6,813,778 B1 * 11/2004 Poli et al. .................... 725/132
2001/0001147 A1 * 5/2001 Hutchison et al. ............ 705/26
2003/0099456 A1 * 5/2003 Ohmura et al. ............... 386/46

FOREIGN PATENT DOCUMENTS

EP 1 022 656 7/2000

(Continued)

OTHER PUBLICATIONS

Wilson, "Implementation of Priority Insurance in Power Exchange Markets", Energy Journal, v18, n1, p. 111 (13), Jan. 1997, ISSN: 0195-6574.*

*Primary Examiner*—Mary D. Cheung
(74) *Attorney, Agent, or Firm*—Lerner, David, Littenberg, Kumholz & Mentlik, LLP

(57) ABSTRACT

An information processing apparatus for receiving data, such as content data. During the time the content data is being downloaded by a terminal over a communication network, the volume of downloaded data being displayed is made smaller than the actual volume of the content data. When the download processing has substantially come to a close, the data volume is displayed to be 80% on a display unit. The user is able to interrupt the processing partway until the data volume indicating the completion of the downloading is displayed to be 80% on the display unit. After the downloading has come to a close, the operation of an interrupt button or of a power supply button is inhibited to enable reliable billing processing.

7 Claims, 10 Drawing Sheets

FOREIGN PATENT DOCUMENTS

| | | |
|---|---|---|
| EP | 1 033 894 | 9/2000 |
| JP | 01263811 A * | 10/1989 |
| JP | 9-027872 | 1/1997 |
| JP | 11-143953 | 5/1999 |
| JP | 11-259972 | 9/1999 |
| JP | 2000-030366 | 1/2000 |
| JP | 2002176582 A * | 6/2002 |
| WO | WO-99/60569 | 11/1999 |

\* cited by examiner

INFORMATION PROCESSING METHOD AND APPARATUS FOR BILLING

TECHNICAL FIELD

This invention relates to information processing methods and apparatus, a recording medium and a program. More particularly, it relates to information processing methods and apparatus for reliably performing billing operations, to a recording medium having recorded thereon a program used for the information processing apparatus of the present invention, and to such program.

BACKGROUND ART

Recently, the Internet has become widespread, such that downloading contents such as audio or video data over the Internet for exploitation has come to be practiced frequently. In downloading the contents, billing processing is usually practiced at a time point of completion of the content downloading.

However, if, at a time point of completion of the content downloading, a power source button is intentionally operated in the OFF direction to turn off the power supply of a receiving terminal, only the content data is stored in the receiving terminal, without the billing processing, with the result that the content may be illicitly acquired free of charge.

DISCLOSURE OF THE INVENTION

In view of the above depicted status of the art, it is an object of the present invention to reliably prohibit the content from being acquired illicitly.

For accomplishing the above object, the present invention provides an information processing apparatus including receiving means for receiving data, interrupting means for interrupting receipt processing of the data partway, billing means for billing for the received data, and inhibiting means for inhibiting the interruption processing by the interruption means until completion of billing processing by the billing means.

The information processing apparatus according to the present invention further includes display means for demonstrating the state of receipt of the data by the receiving means so that receipt of the data is as yet not completed until the billing processing by the billing means comes to a close after the volume of the data received has reached a predetermined value. The display means demonstrates the receiving state of the data by the receiving means so that receipt of the data is as yet not completed until the billing processing by the billing means comes to a close after the end of receipt of the data.

The inhibiting means inhibits interruption processing by the interrupting means until the billing processing by the billing means comes to a close after the volume of the data received has reached a predetermined value. The interrupting means may include means for turning off power supply means.

The present invention also provides an information processing method including a receiving step of receiving data, an interrupting step of interrupting receipt processing of the data partway, a billing step of billing for the received data and an inhibiting step of inhibiting the interruption processing by the interruption step until completion of billing processing by the billing step.

The present invention also provides a program for a recording medium including a receiving step of receiving data, an interrupting step of interrupting receipt processing of the data partway, a billing step of billing for the received data and an inhibiting step of inhibiting the interruption processing by the interruption step until completion of billing processing by the billing step.

The present invention also provides a computer readable program for having a computer execute a receiving step of receiving data, an interrupting step of interrupting receipt processing of the data partway, a billing step of billing for the received data and an inhibiting step of inhibiting the interruption processing by the interruption step until completion of billing processing by the billing step.

With the information processing method and apparatus, recording medium and the program according to the present invention, it is possible to inhibit the interruption of data receipt processing until the billing processing comes to a close.

Other objects, features and advantages of the present invention will become more apparent from reading the embodiments of the present invention as shown in the drawings.

BEST MODE FOR CARRYING OUT THE INVENTION

An embodiment of applying the present invention to a content furnishing system is hereinafter explained.

Figure 1:
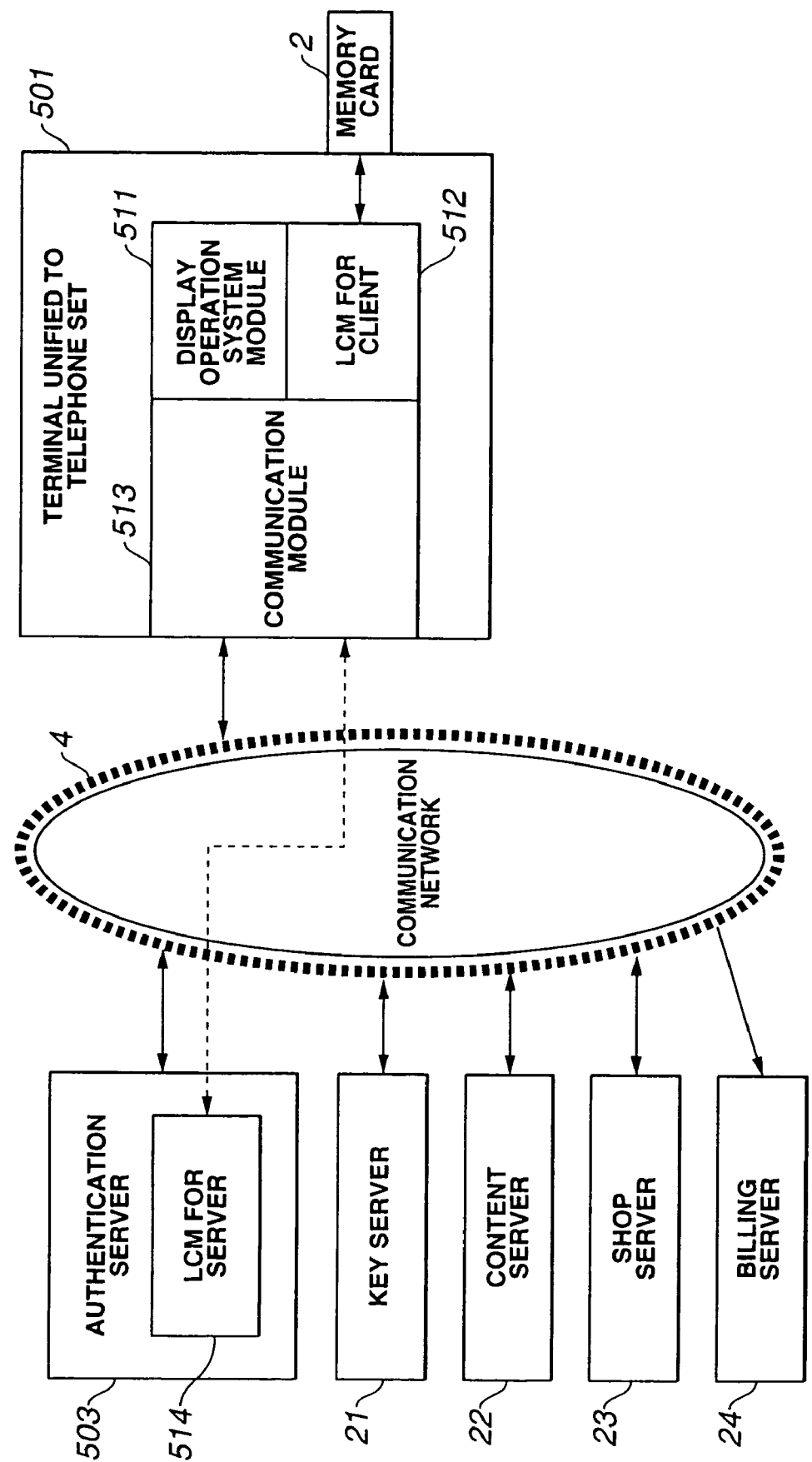
FIG. 1 is a block diagram showing the structure of a content supplying system according to the present invention.

The content furnishing system, according to the present invention, is configured as shown in FIG. 1.

A key server 21, forming a content furnishing system, according to the present invention, has stored therein a content key used for decoding the content supplied by content server 22 to a terminal unit integrated to a telephone set 501 and is responsive to a request from the terminal unit integrated to a telephone set 501 to send the content key to the terminal unit integrated to a telephone set 501. Before sending the content key, the key server 21 and the terminal unit integrated to a telephone set 501 execute the processing of reciprocal authentication, with the key server 21 encrypting the content key with a transient key co-owned by the processing of the reciprocal authentication to transmit the encrypted content key to the terminal unit integrated to a telephone set 501. The terminal unit integrated to a telephone set 501 decodes the received content key with the co-owned transient key.

A content server 22 is responsive to the request from the terminal unit integrated to a telephone set 501 to send the content encrypted with for example the using conditions for the content to the terminal unit integrated to a telephone set 501 over for example a communication network 4, such as the Internet.

A shop server 23 furnishes digital data, pertinent to content supplied by the content server 22, to the terminal unit integrated to a telephone set 501, while supplying for example the URL (Uniform Resource Locator) of the content server 22, supplying the content, and the URL etc of the key server 21 supplying the content key decoding the content, to the terminal unit integrated to a telephone set 501, in order to cope with a content purchasing request from the terminal unit integrated to a telephone set 501. The digital data pertinent to the content includes the name or the price of the music air of the content, a list of the contents and so forth.

A billing server 24 executes billing processing for the terminal unit integrated to a telephone set 501 which has purchased the content over the communication network 4.

The terminal unit integrated to a telephone set 501 is designed so that a memory card 2 may be loaded thereon, and is connected over a wireless route to the communication network 4. The terminal unit integrated to a telephone set 501 downloads the content, received from the content server 22, over the communication network 4, along with for example the using condition data, to cause the content and the use conditions therefor in a memory card 2 loaded thereon. The content handled is compressed and encrypted in accordance with a predetermined format.

Based on the use condition data, relevant to the content, the terminal unit integrated to a telephone set 501 reproduces the content stored in the loaded memory card 2 to output the reproduced data to an audio reproducing unit 607 (see FIG. 4 as explained later). A user carrying the terminal unit integrated to a telephone set 501 is able to download desired content at a desired site to cause the content to be stored in the memory card 2. The user may cause the content stored in the memory card 2 to be reproduced by the terminal unit integrated to a telephone set 501 to listen to the music as content with for example an audio reproducing unit 607.

A display operating system module 511 allows data pertinent to content, such as musical air title or use conditions, to be displayed, while allowing for example downloading commands to be input and allowing an LCM (Licenced Compliant Module) for client 512 of the terminal unit integrated to a telephone set 501 to execute the processing corresponding to the commands. The LCM for client 512 of the cooperates with an LCM for server 514 of an authentication 503 to execute a series of operations of downloading the use condition data and the content etc. The series of operations will be explained subsequently in detail.

The LCM for client 512 of the terminal unit integrated to a telephone set 501 is made up by a set of modules designed for managing control to permit the content to be used only under using conditions specified by a copyright owner in connection with individual contents. The use conditions include content reproducing conditions, content copying conditions, content moving conditions or content storage conditions.

The LCM for client 512 performs authentication as to whether or not the memory card 2 loaded on the terminal unit integrated to a telephone set 501 is an authentic one. With the progress of processing, such as content movement, the LCM for client 512 generates and supervises a necessary key or controls the communication with the memory card 2 connected thereto.

An authentication server 503 executes an LCM for server 514 to execute the processing for authentication with the key server 21 to comply with a request from the terminal unit integrated to a telephone set 501 as an entity of the reciprocal authentication. Following the processing of reciprocal authentication with the key server 21, the authentication server 503 receives a content key from the key server 21 to supply the received content key to the terminal unit integrated to a telephone set 501.

The terminal unit integrated to a telephone set 501 is able to execute authentication processing with the key server 21 to acquire the content key.

Figure 2:
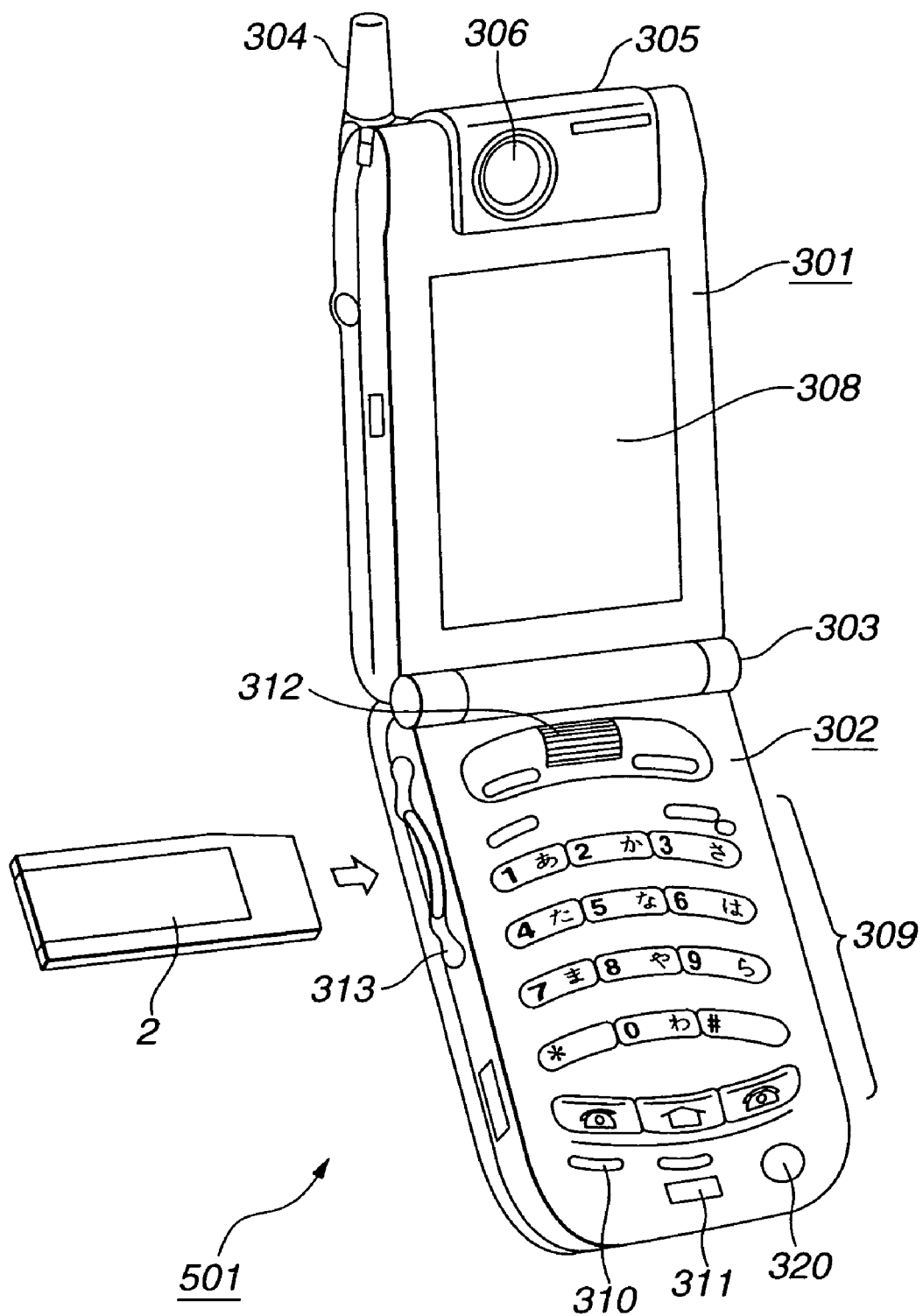
FIG. 2 is a perspective view showing the outer structure of a terminal unit unified to a telephone set shown in FIG. 1.
Figure 3:
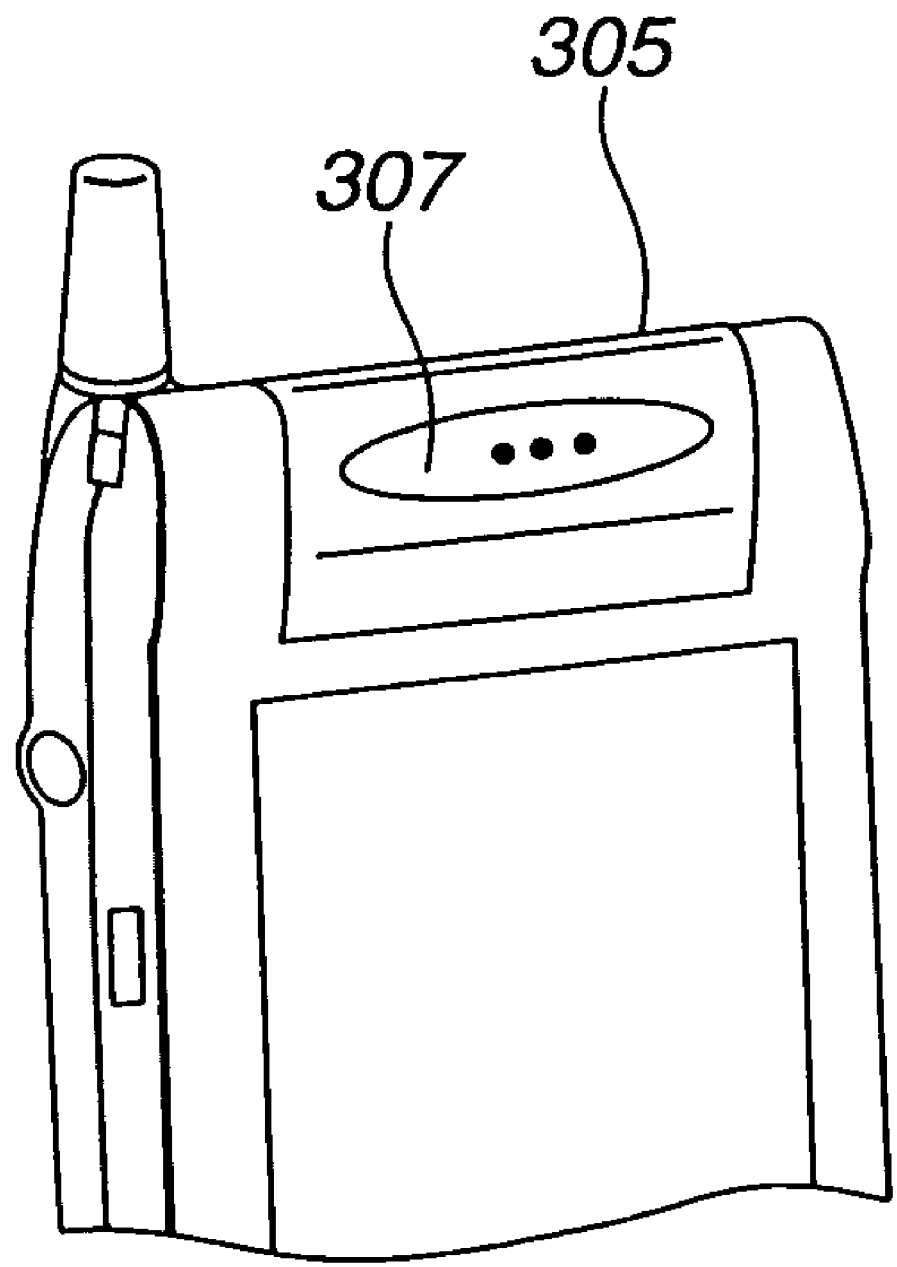
FIG. 3 is a perspective view showing the structure of a portion of a back side of the terminal unit unified to a telephone set shown in FIG. 2.

The outer structure of the terminal unit integrated to a telephone set 501 is hereinafter explained. The terminal unit integrated to a telephone set 501 is made up by a display unit 301 and a main body unit 302, and is collapsible at a center hinge 303, as shown in FIG. 2.

A display unit 301 includes an antenna for transmission/reception 304. The terminal unit integrated to a telephone set 501 transmits/receives electrical waves with a base station, as a stationary radio station, over antenna 304, by way of communication with each server connected to the communication network 4. This display unit 301 includes a camera unit 305 which may be rotated through an angular extent of approximately 180°. The terminal unit integrated to a telephone set 501 images a desired object by a CCD (charge-coupled device) camera 306 of the camera unit 305.

When the camera unit 305 is rotated through approximately 180° and positioned by the user, the display unit 301 is positioned such that a loudspeaker 307 provided at the center of the back side of the camera unit 305 is oriented towards the front side. This switches the terminal unit integrated to a telephone set 501 to the usual call state.

The display unit 301 includes a liquid crystal display 308 on its front side. The liquid crystal display 308 demonstrates the contents of an electronic mail, a simplified home page, an image picked up with the CCD camera 306 or an image of a map indicating a route, in addition to the state of receiving electrical waves, residual cell capacity, names of callees registered as a telephone directory, and the transmission hysteresis.

The main body unit 302 also includes, on its surface, numerical keys of from 0 to 9, operating keys 309, such as call keys, re-dial keys, clear keys or E-mail keys. A power supply button 320, as one of the operating keys 309, is pressed when turning the power supply on or off or when terminating the call. A variety of commands corresponding to the operation of the operating keys 309 are input to the terminal unit integrated to a telephone set 501. A memo button 310 and a microphone 311 are provided on an underside of the operating keys 309 of the main body unit 302. When the memo button 310 is pressed, the terminal unit integrated to a telephone set 501 records the callee's speech. The terminal unit integrated to a telephone set 501 collects the callee's speech during the call with the microphone 311.

A rotatable jog dial 312 is mounted to the upper side of the operating keys 309 of the main body unit 302 in such a state that the jog dial is protruded slightly from the surface of the main body unit 302. The terminal unit integrated to a telephone set 501 is responsive to the rotating operation for the jog dial 312 to execute a variety of operations, such as scrolling a list of the telephone directory or an electronic mail, demonstrated on the liquid crystal display 308, paging the simplified home page, or image feeding.

For example, the main body unit 302 is responsive to the user's operation of rotating the jog dial 312 to select the desired telephone number from plural telephone numbers of the list of the telephone directory demonstrated on the liquid crystal display 308. When the jog dial 312 is thrust towards the interior of the main body unit 302, the main body unit 302 determines the selected telephone number to perform an automatic calling operation for the determined telephone number.

On the back side of the main body unit 302 is mounted a battery pack, not shown. When the power supply button 320 is activated, the power is supplied from the battery pack to respective circuits to set the operable state of the main body unit.

In an upper portion of the left side surface of the main body unit 302 is formed a memory card slot 313 in which to load the removable memory card 2. When the memory card 2, in which data of an image of a map indicating the route is stored, is loaded in the memory card slot 313, the terminal unit integrated to a telephone set 501 reads out (reproduces) data of the image from the memory card 2 to display the image of the map indicating the route on the liquid crystal display 308.

When the memo button 310 is pressed, the terminal unit integrated to a telephone set 501 records the callee's speech on the loaded memory card 2. Responsive to the user's operation, the terminal unit integrated to a telephone set 501 records the electronic mail, simplified home page and an image picked up by the CCD camera 306 on the loaded memory card 2.

The memory card 2 is formed by Memory Stick, which is a sort of the flash memory card developed by SONY COOPERATION, an assignee of the present application. This memory card 2 is comprised of a flash memory device, a sort of the an EEPROM (Electrically Erasable and Programmable Read-Only Memory) which is an electrically rewritable and erasable non-volatile memory, housed within a small-sized thin type plastic casing 21.5 mm length, 50 mm width and 2.8 mm thickness. The Memory Stick enables various data, such as images, speech or music, to be written and read out via 10-pin terminals.

The memory card 2 uses a unique serial protocol, capable of providing for interchangeability for an equipment used, even on the occasion of changes in specifications of the enclosed flash memories, brought about by for example an increased capacity, and achieves a high speed performance of the maximum write speed of 1.5 MB/sec and a maximum readout speed of 2.45 MB/sec, while also achieving high reliability through provision of an inadvertent erasure prohibiting switch.

Since the memory card 2 can be loaded on the terminal unit integrated to a telephone set 501, data can be co-owned through the memory card 2 with for example other electronic equipment, such as personal computer.

Figure 4:
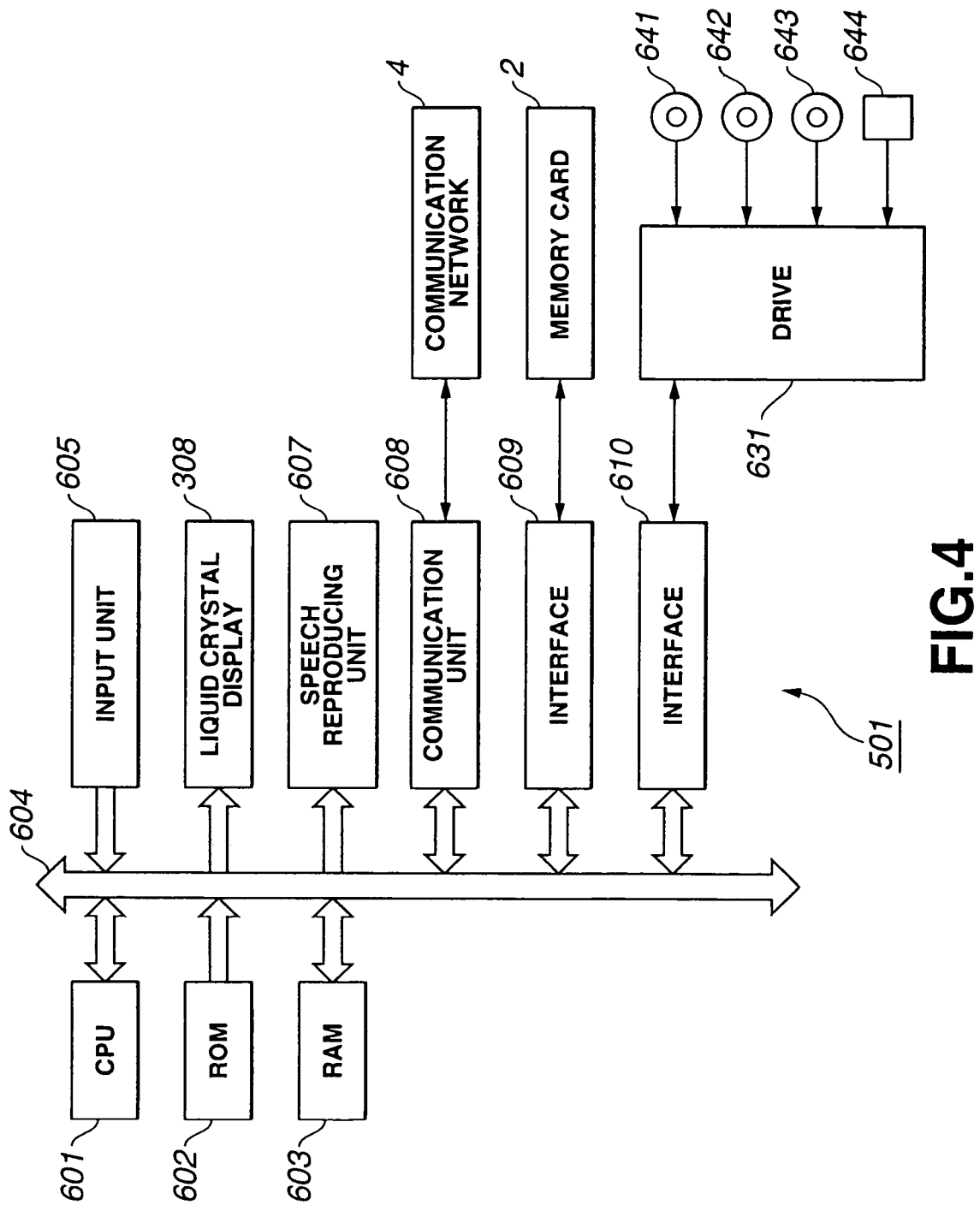
FIG. 4 is a block diagram showing the structure of the terminal unit unified to a telephone set shown in FIG. 1.

FIG. 4 illustrates an internal structure of the terminal unit integrated to a telephone set 501. A CPU (Central Processing Unit) 601 actually executes the various programs stored in a ROM (Read-Only memory) 602 or a RAM (Random-Access Memory) 603. The ROM 602 is formed by an EEPROM (Electrically Erasable and Programmable Read-Only Memory) or a flash memory, and generally stores basically fixed data among the programs or operating parameters used by the CPU 601. The RAM 603 is formed by an SRAM (Static RAM), and stores programs used in the processing executed by the CPU 601 or parameters that are optionally changed during the program execution.

An input unit 605 is formed by an operating key 309, a microphone 311 etc and is acted on by the operator for inputting various commands to the CPU 601 or inputting the speech. The liquid crystal display 308 demonstrates the various information by text or images.

An audio reproducing unit 607 includes a loudspeaker 307 and reproduces callee's speech data supplied from the communication unit 608 or the content stored in the memory card 2 and supplied via interface 609.

The communication unit 608 is connected to the communication network 4 and stores data supplied from the CPU 601, such as a content transmission request or user's speech data supplied from the input unit 605, in a packet of a predetermined format, to transmit the data over the communication network 4. The communication unit 608 outputs the data stored in the received packet, such as content or the data of the callee's speech, to the CPU 601, RAM 603, speech reproducing unit 607 or to the interface 609.

The interface 609 causes the data supplied from the CPU 601, RAM 603 or the communication unit 608 to be stored in the loaded memory card 2, while causing data, such as content, to be read out from the loaded memory card 2 and sent to the CPU 601, RAM 603 or to the speech reproducing unit 607

To the interface 610 is connected an external drive 631, which external drive 631 reads out data or a program, recorded in a magnetic disc 641, an optical disc 642, inclusive of a CD-ROM, a magneto-optical disc 643 or a semiconductor memory 644, to send the data or program to the ROM 602 or to the RAM 603, connected over interface 610 and bus 604.

The components from CPU 601 through to interface 610 are interconnected over bus 604.

Figure 5:
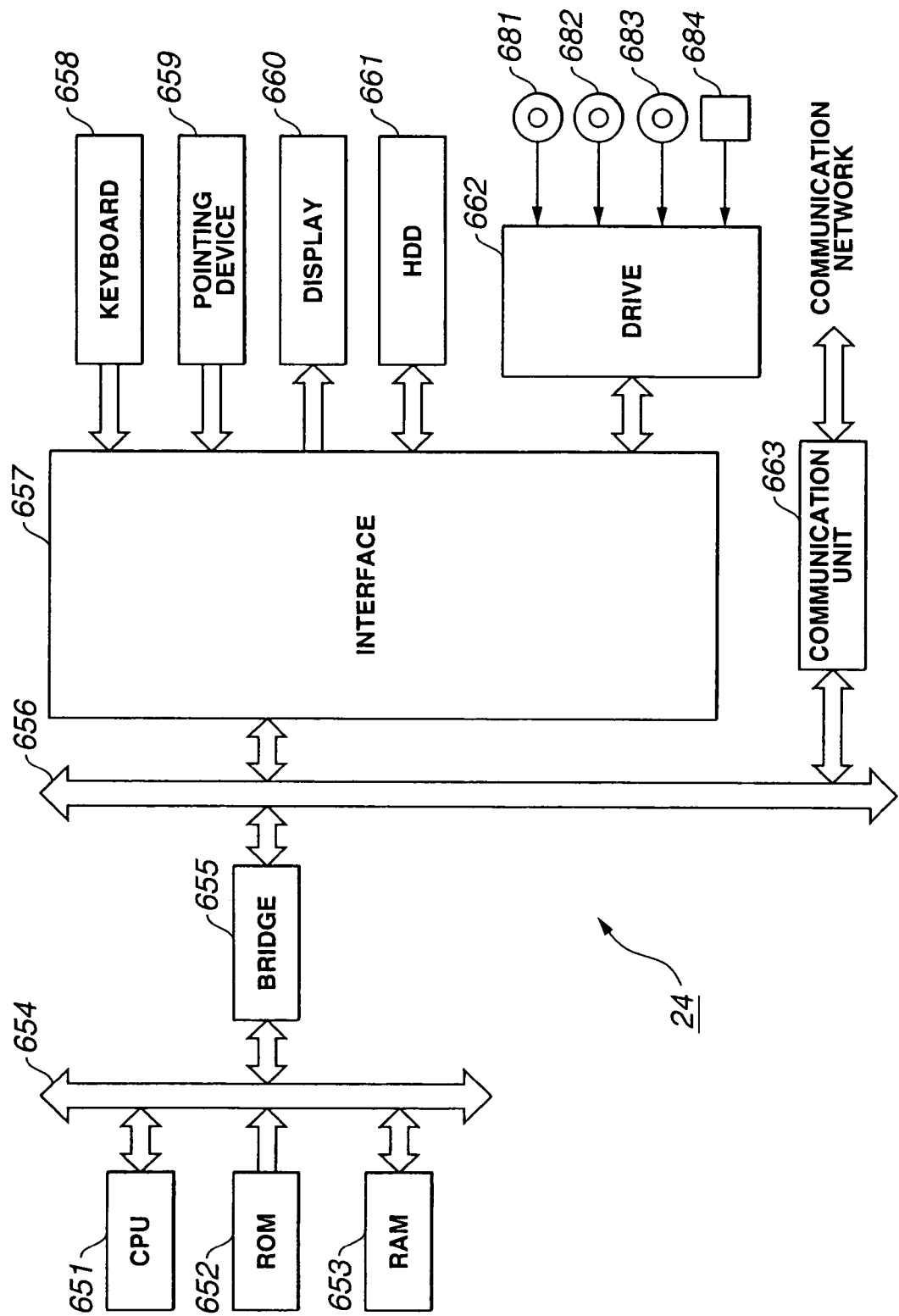
FIG. 5 is a block diagram showing the structure of a billing server shown in FIG. 1.

FIG. 5 illustrates the structure of the billing server 24. A CPU 651 actually executes various application programs, which will be explained in detail subsequently, and an OS (operating system). The CPU 651 typically causes basically fixed data, among the programs or operating parameters it uses, to be stored in the ROM 652. The RAM 653 stores the program used in thee execution of the CPU 651 and parameters changed from time to time during program execution. These components are interconnected over a host bus 654 comprised for example of a CPU bus. The host bus 654 is connected via a bridge 655 to a PCI (Peripheral Component Interconnect/Interface).

A keyboard 658 is acted on by the user for inputting various commands to the CPU 651. A pointing device 659 is acted on by the user for pointing to or selecting a spot on the screen of a display 660. The display 660 is comprised for example of a liquid crystal display device or a CRT (Cathode Ray Tube) for demonstrating the various information with text or images. An HDD (Hard Disc Drive) 661 drives a hard disc to record or reproduce the information or the program executed by the CPU 651.

A drive 662 reads out the data or the program, recorded on a magnetic disc 681, an optical disc 682, a magneto-optical disc 683, or a semiconductor memory 684, to send the data or the program to the RAM 653, to which the RAM is connected via interface 657, external bus 656, bridge 655 or host bus 654.

The components from the keyboard 658 through to the drive 662 are connected to the interface 657, which interface 657 is connected through external bus 656, bridge 655 and host bus 654 to the CPU 651.

To a communication unit 663 is connected the communication network 4, in such a manner that data supplied from the CPU 651 or the HDD 661, such as content key, is stored in a packet of a predetermined format and transmitted over communication network 4, while data stored in the received packet, such as the content, is output to the CPU 651, RAM 653 or to the HDD 661.

The communication unit 663 is connected via external bus 656, bridge 655 and host bus 654 to the CPU 651. The key server 21, content server 22, shop server 23 and the authentication server 503 are also constructed similarly to the billing server 24, although the manner of construction is not shown.

Figure 6:
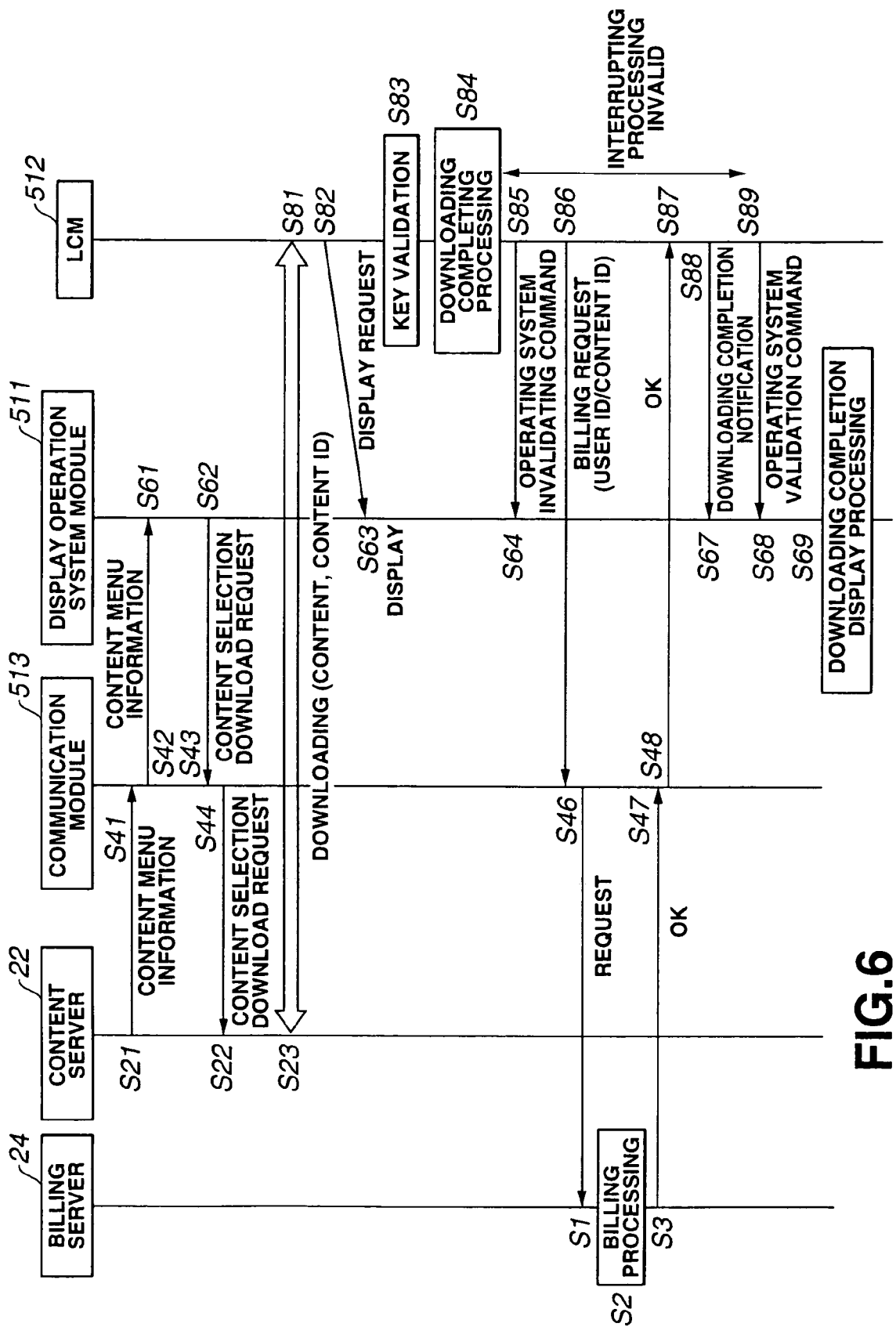
FIG. 6 illustrates the operation of the system shown in FIG. 1.

The operation of the content furnishing system is now explained with reference to FIG. 6. The content server 22 at step S21 transmits the content menu information over communication network 4 to the terminal unit integrated to a telephone set 501. On receipt at step S41 of the content menu information through the communication network 608, a communication module 513, loaded on the CPU of the terminal unit integrated to a telephone set 501, transfers the content menu information at step S42 to the display operating system module 511.

On receipt at step S61 of the content menu information, the display operating system module 511 outputs the received information to the liquid crystal display 308 for display thereon. The user views the content menu information, demonstrated on the liquid crystal display 308 to act on the input unit 605 to select the content desired to be downloaded.

Based on a command from the user, the display operating system module 511 at step S62 outputs the content selection information and a download command to the communication module 513.

On receipt of the content selecting information and a download command at step S43, the communication module 513 controls the communication unit 608 at step S44 to transmit the content selecting information and a downloading request over communication network 4 to the content server 22.

On receipt at step S22 of the content selection information and the download command, the content server 22 proceeds to authentication processing with the LCM 512 of the terminal unit integrated to a telephone set 501, through the server for LCM 514 of the authentication server 503. If the correct authentication information has been acquired, the data of the specified content and the content ID specifying the content are sent through the communication network 4 to the LCM 512.

The server for LCM 514 is responsive to the request from the terminal unit integrated to a telephone set 501, authenticated by the reciprocal authentication, to execute the authentication processing with the key server 21. Following the processing of reciprocal authentication with the key server 21, the server for LCM 514 of the authentication server 503 receives a content key from the key server 21 and sends the received content key to the terminal unit integrated to a telephone set 501.

On receipt at step S81 of the content data and the content ID, the LCM 512 of the terminal unit integrated to a telephone set 501 causes the content data and the content ID to be transiently stored in the RAM 603 and to be then supplied through interface 609 to the memory card 2 for storage therein.

At step S82, the LCM 512 outputs a display request to the display operating system module 511 to cause display matched to the data volume of the downloaded content data.

Figure 7:
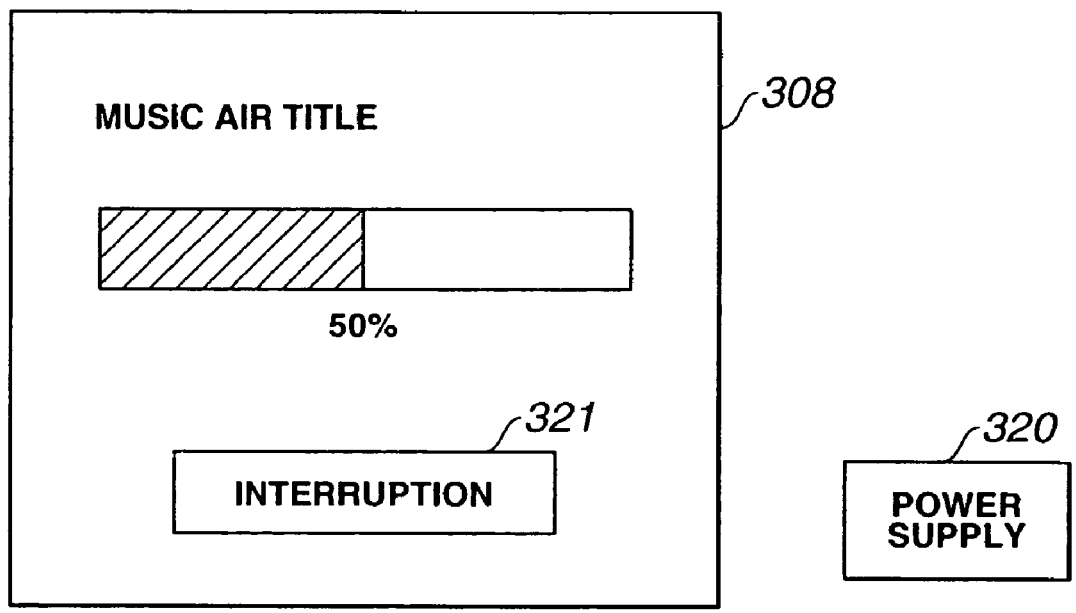
FIG. 7 shows an instance of a picture illustrating the content downloading state.

On receipt of this request at step S63, the display operating system module 511 causes a picture, indicating the downloading process, shown in FIG. 7, to be demonstrated on the liquid crystal display 308. In an embodiment of FIG. 7, the title of the musical air being downloaded, a numerical figure corresponding to the downloaded data volume at the relevant time, and an interrupt button 321 acted on in interrupting the downloading, are displayed. In the case of the present embodiment, the numerical figure corresponding to the downloaded data volume is to be lesser than the actual data volume, for example 50%.

The LCM 512 at step S83 performs the processing of validating the key used for decoding the encrypted content. When the downloaded data volume has reached 100%, that is when the downloading processing has internally been terminated, the LCM 512 at step S84 executes the download end processing. That is, the LCM 512 inhibits the interrupting processing of the downloading processing until the time of notification of the end of the billing processing. Stated differently, if the interrupt button 321 is acted on before such time, the CPU 601 causes the down loading processing to be interrupted.

In the download end processing, the LCM 512 at step S85 outputs an operating system invalidating command to the display operating system module 511. On receipt at step S64 of an operating system invalidating command from the LCM 512, the display operating system module 511 inhibits the use of the interrupt button 321, while controlling the liquid crystal display 308 to switch the display state of the interrupt button 321 to a state different from the usable state of FIG. 7, as shown for example in FIG. 8. Moreover, the display operating system module 511 inhibits the use of the power supply button 320 of the terminal unit integrated to a telephone set 501 and turns off its back light to set a state different from the state shown in FIG. 7. The result is that, if the user acts on the interrupt button 321 or the power supply button 320, this operation is not accepted, that is the operation is ineffective. That is, the downloading processing can subsequently not be interrupted. On the other hand, the user is able to recognize, from the button display, that the interruption is not feasible.

Figure 8:
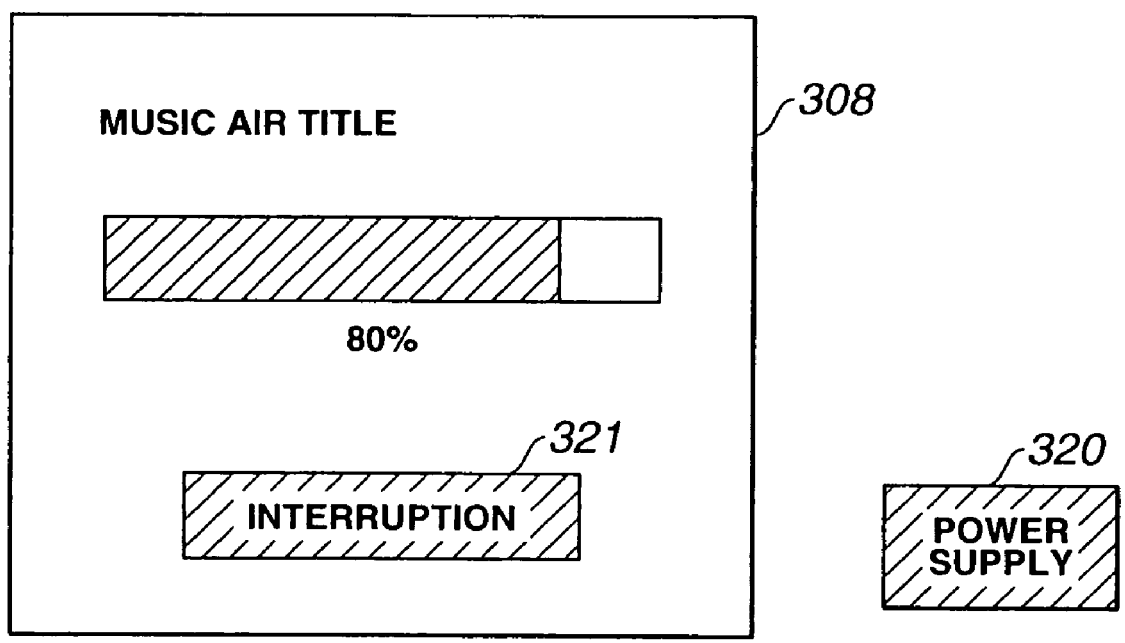
FIG. 8 is a view similar to FIG. 7 illustrating an instance of a picture illustrating the content downloading state.

It is noted that the data volume displayed is not 100%, but 80%, that is smaller than the actual data volume, as shown in FIG. 8. This may frustrate the user's intention to interrupt the downloading partway.

At step S86, the LCM 512 outputs a command for invalidating the operating system and subsequently outputs a billing request to the communication module 513. In this billing request, there are contained a user ID of the terminal unit integrated to a telephone set 501 and a content ID of the content being downloaded.

After receiving the billing request, the communication module 513 at step S46 outputs the billing request to the billing server 24.

On receipt of the request from the communication module 513 through the communication unit 663, the CPU 651 of the billing server 24 at step S2 executes the billing processing. That is, the CPU performs the processing of billing for the purchase of the content of the content ID.

Then, at step S3, the CPU 651 of the billing server 24 outputs an OK signal indicating the completion of the billing to the communication module 513.

On receipt of the OK signal at step S47, the communication module 513 at step S48 transfers this OK signal to the LCM 512.

On receipt of this OK signal at step S47, the LCM 512 at step S48 cancels the interruption processing inhibiting state to notify the display operating system module 511 of the completion of downloading. The display operating system module 511 at step S67 receives this download completion notification.

At step S89, the LCM 512 outputs a command for validating the operating system next to the download completion notification of step S88.

Figure 9:
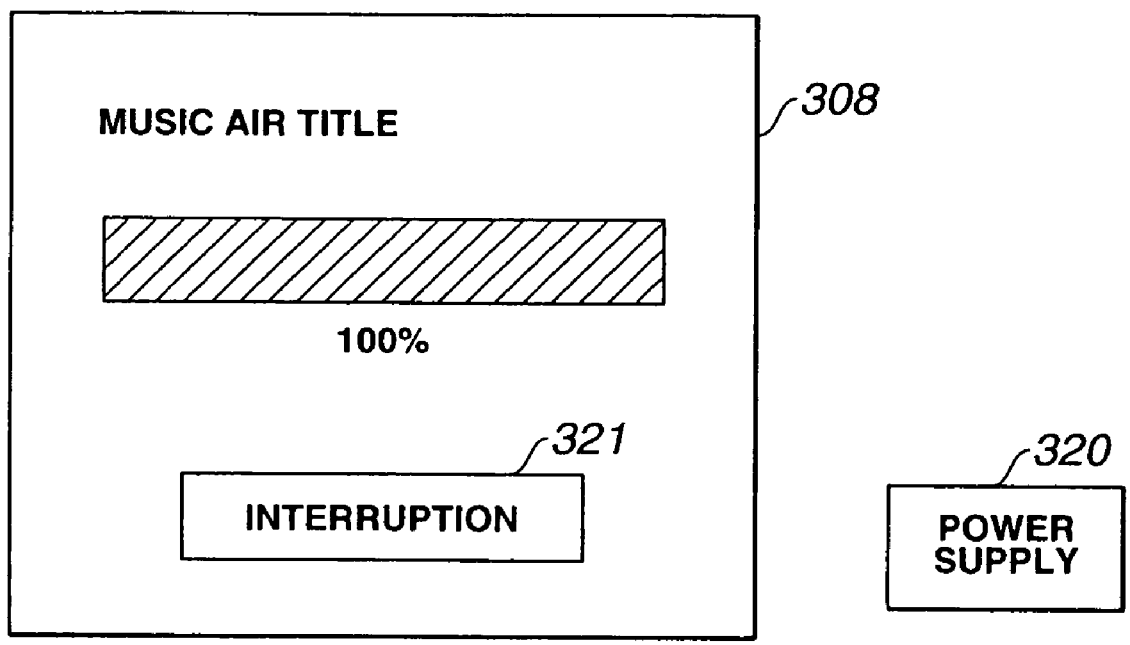
FIG. 9 is a view similar to FIGS. 7 and 8 illustrating an instance of a picture illustrating the content downloading state.

On receipt of the command for validating the operating system, the display operating system module 511 at step S68 changes the image indicating the download state to a state shown in FIG. 9. That is, in the embodiment of FIG. 9, it is shown that the downloaded data volume is 100%, with the interrupt button 321 being changed to the usable state. Moreover, the display operating system module 511 changes the power supply button 320 to the operation enabling state.

Figure 10:
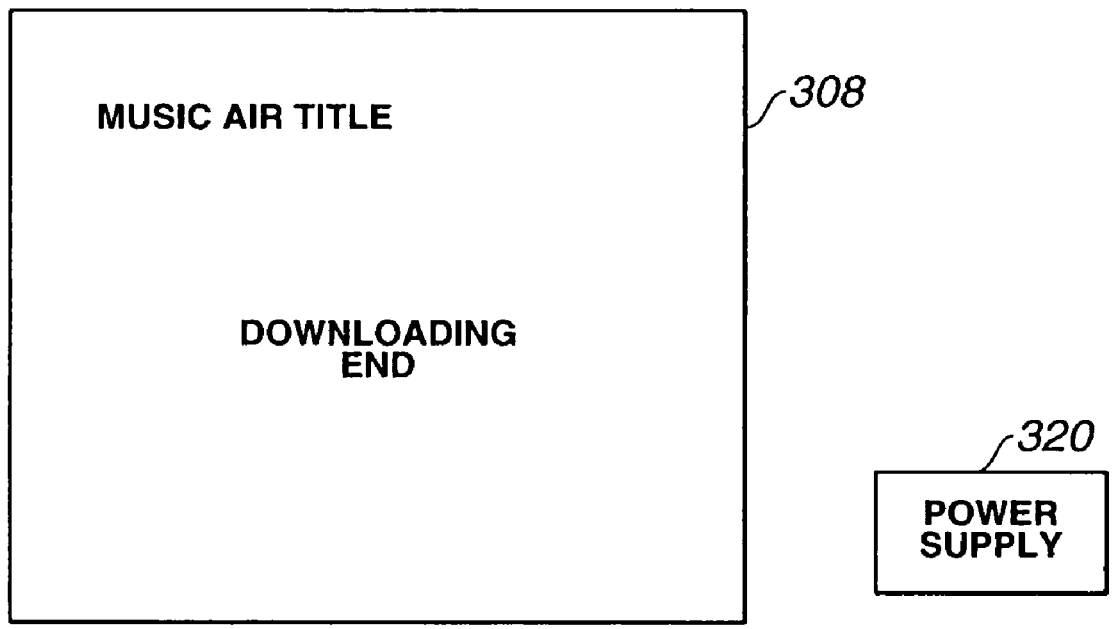
FIG. 10 is a view similar to FIGS. 7, 8 and 9 showing an embodiment of a picture illustrating the content downloading state.

The display operating system module 511 then at step S69 executes the processing for demonstrating the completion of downloading. That is, the display operating system module 511 changes the display on the liquid crystal display 308 to a state shown in FIG. 10. In the embodiment of FIG. 10, the title of the music air and a message reading: [Downloading end] are displayed. The user may thus be advised of the completion of downloading.

In the above-described embodiment, the lesser volume of the downloaded content data is displayed than the actual data volume and, when the volume of the downloaded content data has reached 100%, that is when the volume of the downloading processing has internally been completed, the operation of the interrupt button 321 or the power supply button 320 is inhibited. It is however possible to display the actual data volume and the operation of the interrupt button 321 and the operation of the power supply button 320 may be inhibited when the downloaded content data has reached 80%.

If prolonged time, such as 30 seconds, is taken in the billing processing, there is a fear that the user takes this state as being due to the malfunction of the terminal unit integrated to a telephone set 501.

Thus, if a timer is activated after the LCM 512 has issued a billing request, such that the billing OK signal is not received after lapse of for example 10 seconds, a downloading completion notification may be issued at step S88 to the LCM 512. Although there is a fear that the billing processing is not carried out completely, the user may not feel uneasy in such case.

In the foregoing, the content is downloaded by the terminal unit integrated to a telephone set 501. Alternatively, the content data may be downloaded not to the terminal unit integrated to a telephone set 501 but to a personal computer, portable telephone set, PDA (Personal Digital Assistant), a digital video cassette tape recorder having a communication and imaging function, an electronic memo device with a communication function, or a portable personal computer.

Although the content is the music air data in the above-described embodiment, the present invention may also be applied in case the it is not the music sound data but the still image data, moving picture data, text data or program data that is downloaded.

Although the above-described sequence of operations may be executed by the hardware, it may also be executed by the software. When the sequence of the processing operations is executed by the software, a program forming the software is installed from a program storage medium to a computer having a dedicated hardware installed thereon or to a personal computer that is able to execute various functions by installing various programs.

A program storage medium for storage of a program installed on and executed by a computer is formed by magnetic discs 641, 681, inclusive of floppy discs, optical discs 642, 682, inclusive of CD-ROM (Compact Disc-Read-Only Memory) and DVD (Digital Versatile Disc), magneto-optical discs 643, 683, inclusive of MD (Mini-Disc), package mediums, such as semiconductor memories 644, 684, ROMs 602, 652, or HDD 661, in which the program may be stored transiently or permanently. The program may be stored in the program storage medium through the communication unit 608 or 663 or through a wired or wireless communication medium, such as local area network, Internet or digital satellite broadcast.

In the explanation of the present invention, the steps stating the program stored in a program storage medium include the processing which is not necessarily carried out chronologically, but carried out in parallel or individually, in addition to, of course, the processing carried out chronologically in accordance with the stated sequence.

In the above explanation, the system represents the entire apparatus formed by plural devices.

INDUSTRIAL APPLICABILITY

According to the present invention, data receipt interruption is inhibited until the end of the billing processing, so that the billing processing can be carried out reliably to prevent illicit data acquisition.

The invention claimed is:

1. An information processing apparatus comprising:
   receiving means for receiving data from a content server;
   interrupting means for interrupting an operation of receiving the data by the receiving means;
   billing means for billing a user for said data that has been received; and
   inhibiting means for inhibiting operation of the interrupting means until completion of the billing by said billing means.

2. The information processing apparatus as recited in claim 1 further comprising:
   display means for displaying to the user a symbol of the interrupting means, and wherein the inhibiting means causes the display means to change the symbol of the interrupting means so as to indicate that the operation of the interrupting means is unavailable.

3. The information processing apparatus as recited in claim 2 wherein
   said display means demonstrates the state of the receiving of said data by said receiving means so that receipt of said data is not completed until the billing by said billing means comes to a close after an end of the receiving of said data.

4. The information processing apparatus as recited in claim 1 wherein
   said inhibiting means inhibits the interrupting by said interrupting means until the billing by said billing means comes to a close after a volume of the data received has reached a predetermined value.

5. The information processing apparatus as recited in claim 1 wherein
said interrupting means includes turn-off means for turning off a power supply.

6. An information processing method comprising:
a receiving step of receiving data from a content server;
an interrupting step of interrupting an operation of receiving the data by the receiving step;
a billing step of billing for the data received in said receiving step; and
an inhibiting step of inhibiting operation by said interrupting step until completion of the billing by said billing step.

7. A recording medium having recorded thereon a computer-readable program comprising:
a receiving step of receiving data from a content server;
an interrupting step of interrupting an operation of receiving the data by the receiving step;
a billing step of billing for the data received in said receiving step; and
an inhibiting step of inhibiting operation by said interrupting step until completion of the billing by said billing step.

* * * * *

UNITED STATES PATENT AND TRADEMARK OFFICE
CERTIFICATE OF CORRECTION

| | | |
|---|---|---|
| PATENT NO. | : 7,243,084 B2 | |
| APPLICATION NO. | : 10/311651 | |
| DATED | : July 10, 2007 | |
| INVENTOR(S) | : Naomi Go | |

It is certified that error appears in the above-identified patent and that said Letters Patent is hereby corrected as shown below:

On the Title Page, under (74), "Kumholz" should read --Krumholz--.

Signed and Sealed this

Seventeenth Day of June, 2008

JON W. DUDAS
*Director of the United States Patent and Trademark Office*